S. W. BONSER.
VALVE.
APPLICATION FILED APR. 3, 1911.
1,046,435.
Patented Dec. 10, 1912.
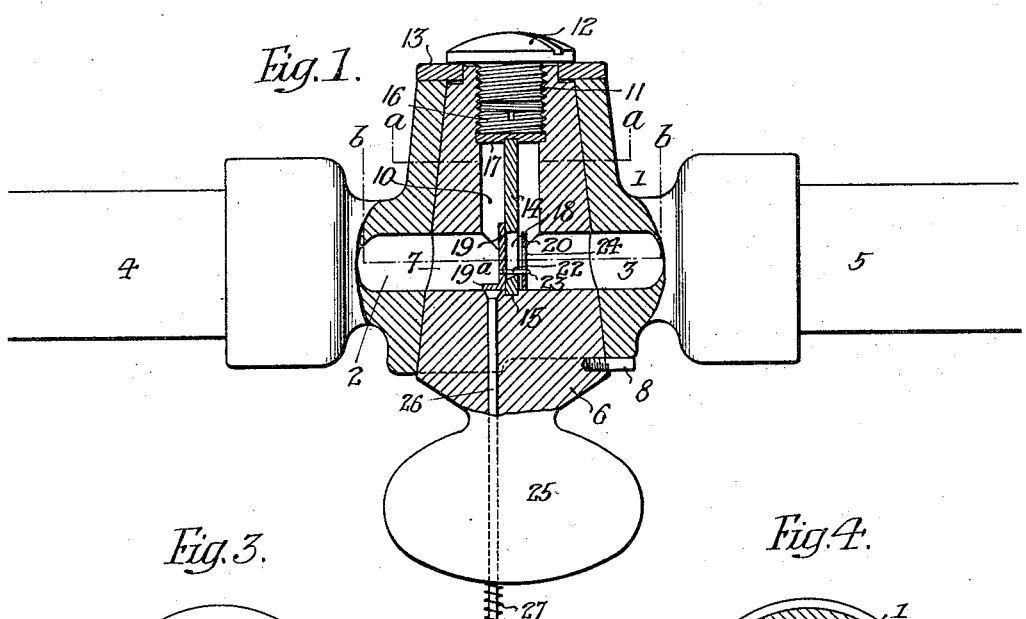
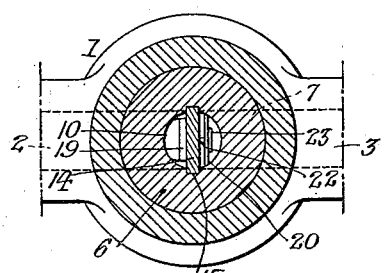
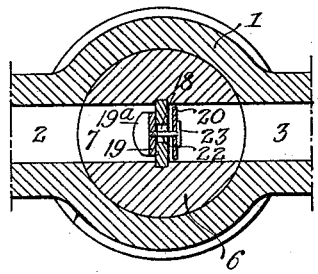
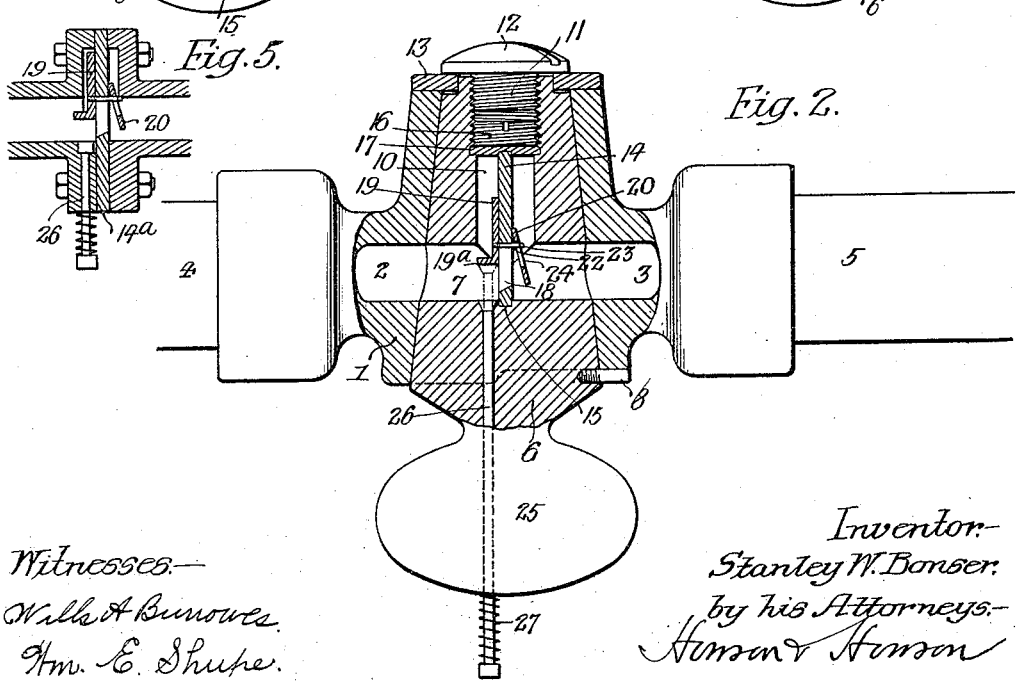
Witnesses:—
Willa A Burrowes
Wm. E. Shupe.
Inventor:—
Stanley W. Bonser.
by his Attorneys.—
Hinson & Hinson

UNITED STATES PATENT OFFICE.

STANLEY W. BONSER, OF PHILADELPHIA, PENNSYLVANIA.

VALVE.

1,046,435.

Specification of Letters Patent.

Patented Dec. 10, 1912.

Application filed April 3, 1911. Serial No. 618,496.

*To all whom it may concern:*

Be it known that I, STANLEY W. BONSER, a citizen of the United States, residing in Philadelphia, Pennsylvania, have invented certain Improvements in Valves, of which the following is a specification.

My invention relates to valves for controlling pressure, and the principal object of my invention is to provide a gas cock or key with self-acting means for closing the bore or gas passage of the same.

My improved structure has been designed more particularly for use in connection with slot meters in order that when the volume of gas of a predetermined value controlled by a coin shall have ceased to flow by reason of the mechanism shutting off the supply, the bore or the valve of the cock or key shall be closed so that when a coin is subsequently placed in the meter to cause the further flow of gas, the latter will not pass the valve until the self-acting means shutting off such flow shall have been operated; thus preventing in complete measure all danger of asphyxiation. It will be understood, of course, that my improved valve might be employed with any tubular structure having a bore or through passage for fluid to automatically close such bore when the pressure or flow of the fluid ceased. These and other features of my invention will be more fully referred to hereinafter, reference being had to the accompanying drawings, in which:

Figure 1, is a sectional view of a gas cock or key having the improvements embodying my invention; the valve being shown in the open position while the self-acting closure is shown in the closed position; Fig. 2, is a similar sectional view with the self-acting closure in the open position; Figs. 3 and 4, are sectional plan views of the structure forming the subject of my invention, on the lines *a—a* and *b—b*, respectively, and Fig. 5, is a view of a modification within the scope of my invention.

Gas cocks or keys of the type to which my invention may be applied are well known and comprise a suitable shell or casing 1 having inlet and outlet passages 2 and 3, communicating with an inlet pipe 4, and an outlet pipe 5, respectively, the latter leading to a burner, (not shown). The shell 1 is usually provided with a seat for a plug 6 controlling the flow of gas from the inlet to the outlet of such casing. In ordinary instances, this plug is provided with a through passage 7, which coincides with the inlet and outlet passages when in the open position; the plug cutting off said passages when turned to the closed position which is or may be substantially at right angles to the open position. The plug is usually provided with a pin or other stop 8, serving to limit its movement when turned in the positions of fully opened or fully closed. In adapting such structure for use with my invention, I provide the plug with a bore 10 extending longitudinally of the same and meeting the bore or passage 7; the outer end of such bore 10 being threaded at 11 for the reception of a screw 12 in engagement with a washer 13 which serves to retain the plug in the casing. In the bore 10, I provide a division plate 14 which extends to and across the bore 7; the several bores being preferably grooved at 15 to receive the edge of said division plate. This division plate is retained in place by a screw 16; a washer 17 being preferably interposed between the screw and plate 14 so as to insure that no gas shall cross over the same when the structure is in use. Adjacent the bore 7 this division plate 14 is apertured at 18 for several purposes. In the first place such aperture provides a passage for gas or other fluid when the parts hereinafter noted are open. In addition, the division plate carries a sliding valve 19 which, if desired, may be adapted to a suitable groove in the plug adjacent the grooves for the division plate. On the opposite side of this division plate from the valve 19 is a light flap 20. Carried by the valve 19 is a pin 22 extending through the slot 18 and having a suitable head 23 whereby the flap, which is also slotted at 24, may be held in place. The slot in the flap permits the passage of the head 23 of pin 22. The lower end of the valve 19 may be curved to fit the bore 7 of the plug, although such shaping is not essential, as long as it covers the slot or aperture 18 in the division plate 14. In like manner, the lower edge of the flap 20 may also be curved.

Within the grasping portion or handle 25 of the key or plug, I may provide a spring controlled stem 26 underlying the valve 19, and when the key is turned to admit gas or other fluid through the bore 7 of the same, this stem should be pushed up, as indicated by dotted lines in Fig. 2, so as to raise the sliding valve 19 to the upper part of the bore 7, a spring 27 returning said stem to its normal position.

The valve 19 is preferably provided with a flanged portion 19ª, and with the plug valve turned to admit gas or other fluid through the bore 7 of the same the pressure of such gas will act upon the flanged portion of the valve 19 and upon the flap 20, and hold said valve 19 and flap 20 in the elevated positions, as indicated in Fig. 2, as long as gas is passing through the bore 7. The flap 20 is quite light, and it is moved by the pressure of gas to the angle illustrated in Fig. 2, so as to jam slightly against the head of the pin carried by the valve 19, and in such position it materially assists in holding said valve 19 in the elevated position. When, however, the delivery of gas through the meter ceases by reason of the mechanism controlled by the coin having reached the limit of its movement for the value of the coin, the gas will cease to flow and the valve 19 will drop in the manner indicated in Fig. 1, cutting off the flow of gas through the bore 7 of the plug, and before further gas may pass this bore, even though the valve being in the open position with said bore in line with the inlet and discharge passages, no gas will flow until said valve 19 is raised.

It is possible, of course, to employ the valve 19 as the means controlling the passage of fluid through a tubular structure, and in Fig. 5, I have an arrangement in which a pair of pipes have their meeting ends shaped to provide a chamber to receive the valve 19, one flange carrying a stem 26 to raise the same when it is desired to permit flow therethrough. In this instance, the division plate 14ª is in the form of a diaphragm held between the meeting ends of the pipes which may be secured by any suitable form of fastening.

It will be understood that a chamber could be formed in the pipe for the reception of said valve 19 at some point other than the end of the same.

I claim:

1. The combination with a tubular member having a bore or through opening for the passage of fluid, of a diaphragm extending across said opening and having an aperture therein, a valve adapted to close such aperture, means for actuating said valve to permit flow of fluid through said bore, the pressure and volume of such fluid serving to maintain the valve in a position permitting flow through said tubular member, and a supplemental member carried by the valve and acted upon by the pressure to assist in holding said valve open.

2. The combination of a pipe having a bore for the passage of fluid, a valve carried by said pipe and adapted to close such bore, means for opening said valve to permit flow of fluid through said bore, the pressure and volume of said fluid serving to maintain the valve in the open position, and a supplemental member carried by the valve and acted upon by the pressure to assist in holding said valve open.

3. The combination, in a gas key or cock having a bore for the passage of gas, of a valve adapted to close such bore, means for opening the valve, the latter being maintained in the open position by the pressure and flow of gas, and a supplemental member carried by the valve and acted upon by the pressure to assist in holding said valve open.

4. The combination, in a gas key or cock having a bore for the passage of gas, of a slidable valve adapted to close such bore, means for operating the valve, the latter being maintained in the open position by the pressure and flow of gas, and a supplemental member carried by the valve and acted upon by the pressure to assist in holding said valve open.

5. The combination of a gas key or cock having a bore for the passage of gas, a valve adapted to close such bore, means for opening the valve, the latter being maintained in the open position by the pressure and flow of gas, and a supplemental member loosely connected to said valve and under the influence of the pressure of gas, said supplemental member assisting to maintain the valve in the open position.

6. The combination of a gas key or cock having a bore for the passage of gas, a slidable valve adapted to close such bore, means for operating the same, said valve being maintained in the open position by the pressure and flow of gas, and a loose element carried by said valve and under the influence of the gas and assisting in maintaining the valve in the open position.

7. The combination of a tubular member having a bore extending in one direction, a chamber at substantially right angles to said bore and communicating therewith, a division plate or diaphragm disposed in said chamber and extending across the bore, said division plate or diaphragm having an aperture, a valve carried by said division plate or diaphragm to close said aperture, means for raising said valve to uncover the aperture, said valve being held in the raised position by the pressure and flow of gas, and a supplemental member loosely connected to said valve and disposed on the opposite side of the diaphragm, said member being also under the influence of the gas pressure and assisting to maintain the valve in the open position.

8. The combination of a tubular member having a bore and a chamber substantially at right angles thereto, a division plate in said chamber, a valve carried by said division plate, the latter having an opening closed by said valve, a loose flap on the opposite side of the division plate, means loosely connecting said valve and flap, and means for raising said valve, the latter being held in the raised position by the pressure and flow of gas engaging the same and the loose flap.

9. In a gas key or cock, the combination of a plug having a cross bore and a bore at right angles to the cross bore and communicating therewith, a division plate in said second bore, a valve carried by said division plate, the latter having an opening normally closed by said valve, and means for raising said valve, the latter being held in the raised position by the pressure and flow of gas.

10. In a gas key or cock, the combination of a plug having a cross bore and a second bore at right angles to the first and communicating therewith, a division plate in said second bore, a valve carried by said division plate, the latter having an opening closed by said valve, a loose flap on the opposite side of the division plate, means loosely connecting said valve and flap, and means for raising said valve, the latter being held in the raised position by the pressure and flow of gas engaging the same and the loose flap.

In testimony whereof, I have signed my name to this specification, in the presence of two subscribing witnesses.

STANLEY W. BONSER.

Witnesses:
ARTHUR J. PURSSELL,
MURRAY C. BOYER.

---

Copies of this patent may be obtained for five cents each, by addressing the "Commissioner of Patents, Washington, D. C."